United States Patent [19]

Rainbolt

[11] Patent Number: 5,822,326
[45] Date of Patent: Oct. 13, 1998

[54] SYNCHRONIZING DIGITAL AUDIO SIGNALS

[75] Inventor: Joey Lenn Rainbolt, Rough & Ready, Calif.

[73] Assignee: Tektronix, Inc., Wilsonville, Oreg.

[21] Appl. No.: 644,560

[22] Filed: May 10, 1996

[51] Int. Cl.⁶ .................................................. G06F 15/00
[52] U.S. Cl. ........................ 370/503; 375/347; 381/123
[58] Field of Search .................................. 455/133, 134, 455/135, 136; 375/347, 354, 372; 381/123; 370/260, 351, 358, 412, 415, 503, 505, 506, 517, 540; 371/1; 395/2.1, 2.2, 806, 807

[56] References Cited

U.S. PATENT DOCUMENTS

| | | | |
|---|---|---|---|
| 4,349,914 | 9/1982 | Evans | 375/347 |
| 5,621,770 | 4/1997 | Zastera | 375/347 |
| 5,649,234 | 7/1997 | Klappert et al. | 395/806 |
| 5,668,601 | 9/1997 | Okada et al. | 370/503 |

*Primary Examiner*—Benedict V. Safourek
*Attorney, Agent, or Firm*—Francis I. Gray

[57] ABSTRACT

A method and apparatus for synchronizing AES digital audio signals for switching clocks each signal into a respective buffer under control of a recovered clock from each signal. A sync detector for each signal identifies a synchronizing symbol and enables the loading of the corresponding buffer starting with the synchronizing symbol. A common clock is applied to all of the buffers starting with a system sync signal to read out all of the buffers simultaneously in synchronization with each other so that when switched, there is no corruption of the output AES digital audio signal that might cause a "pop" to be heard.

4 Claims, 1 Drawing Sheet

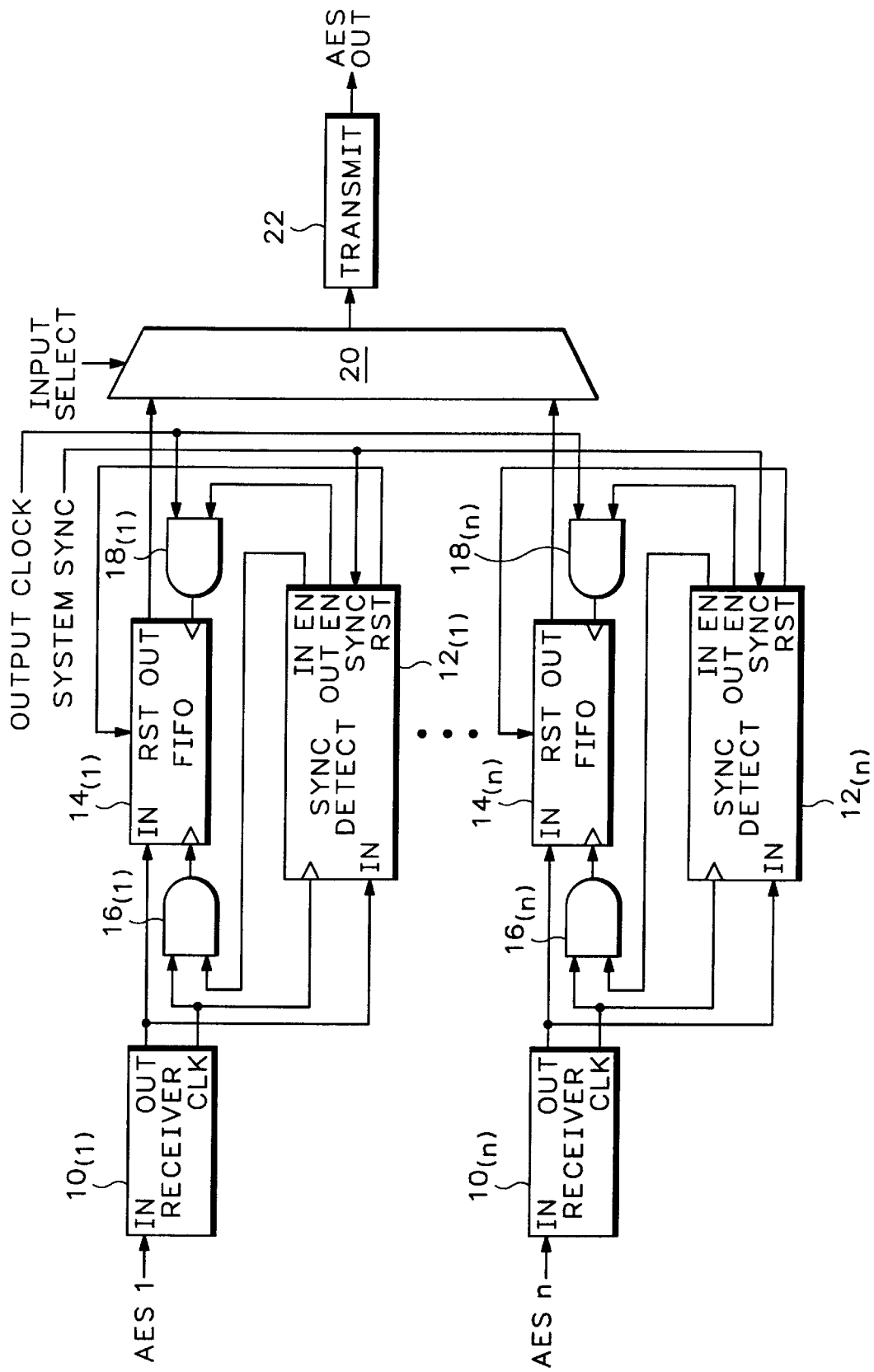

SYNCHRONIZING DIGITAL AUDIO SIGNALS

BACKGROUND OF THE INVENTION

The present invention relates to processing of digital audio signals, and more particularly to synchronizing digital audio signals within a switch matrix or router before they are switched to prevent corruption of the resulting digital audio output stream.

An internationally known standard for the interchange of digital audio signals is the AES3-1992 standard. Under this standard two channels of audio are digitized and then time multiplexed into a single serial digital data stream. This data stream contains certain synchronizing symbols which are used by a receiver of the data stream to demultiplex and deserialize the two digital audio signal channels.

A problem exists when it is necessary to switch between AES data streams that are not synchronized with each other. When this happens the resulting output data stream usually is corrupted because the ordering of the serial bits in the output AES data stream is instantaneously changed at the point of the switch. A receiver of such a signal outputs an incorrect signal from the time of the switch until the receiver has had time to resynchronize itself to the new signal. This process usually manifests itself as an audible "pop" in the decoded audio signal.

What is desired is a way of synchronizing digital audio signals so that when the audio signals are switched the output data stream is not corrupted in order to eliminate an audible "pop" in the audio signal.

SUMMARY OF THE INVENTION

Accordingly the present invention provides an apparatus and method for synchronizing digital audio signals within a switch matrix or router before they are switched to prevent corruption of the resulting output serial digital audio data stream. Each digital audio signal data stream is input to respective receivers to recover the clock from the data stream. The clock is used to input the data stream to a sync detector where a synchronizing symbol within the data stream is identified. The sync detector then provides an enable signal to an input AND gate that allows the clock to input the data stream into a buffer. A common sync system sync is input to each sync detector which in response provides an output enable signal to an output AND gate. A common clock signal is applied to all of the output AND gates so that the respective buffers are clocked out simultaneously in synchronization with each other. The outputs of the buffers are input to a switch/router according to an input select command, and the selected serial digital audio signal data stream is input to an audio transmitter to provide the output serial digital audio signal.

The objects, advantages and other novel features of the present invention are apparent from the following detailed description when read in conjunction with the appended claims and attached drawing.

BRIEF DESCRIPTION OF THE DRAWING

The FIGURE is a block diagram view for an apparatus for synchronizing digital audio signals for switching according to the present invention.

DESCRIPTION OF THE PREFERRED EMBODIMENT

Referring now to the FIGURE each serial digital audio signal data stream is input to a receiver 10, such as that described in U.S. Pat. No. 5,465,268 issued Nov. 7, 1995 to Joe L. Rainbolt entitled "Digital Decoding of Biphase-Mark Encoded Serial Digital Signals" or any other receiver that recovers the embedded clock signal from the input serial digital audio signal data stream. The receiver provides a serial digital audio data stream and a recovered clock signal. The digital audio data stream and the recovered clock signal are input to a sync detect circuit 12. The digital audio data stream also is input to a one-by-n bit first-in, first-out (FIFO) buffer 14 to delay by a variable amount the serial digital audio data stream, and the recovered clock signal is input to an input AND gate 16, the output of which is coupled to a clock input of the FIFO.

The sync detect circuit 12 provides an input enable signal to the input AND gate 16, an output enable signal to an output AND gate 18 and a reset signal to reset the FIFO 14. A system sync signal is applied to each sync detector circuit 12, and an output clock signal is applied as a second input to the output AND gates 18. The output of the input AND gate 16 is coupled to an input clock terminal of the FIFO 14 to write the serial digital audio data stream into the FIFO under control of the recovered clock signal, and the output of the output AND gate 18 is coupled to an output clock terminal of the FIFO to clock out the serial digital audio data stream under control of the common system clock.

The level of the FIFOs 14, and hence the amount of delay incurred, is managed by the sync detect circuit 12 which prevents the input serial digital audio data stream from being written into the FIFO until a certain synchronizing symbol, which is part of the AES format, is detected. The sync detector circuit 12 ensures that the data first written into the FIFOs 14 after a FIFO reset is the sync symbol from channel one of the two channels contained in the serial digital audio data stream. The reset signal from the sync detect circuit 12 maintains the FIFO reset if no data stream input is present on that channel. The system sync signal provides timing information necessary to the sync detector circuit 12 for starting a channel to which the serial digital audio data stream was not previously present by providing the output enable signal to the output AND gate 18. The system sync signal allows the just starting serial digital audio data stream to be clocked out of the FIFO 14 in sync with each of the serial digital audio data streams from the other FIFOs. As a result the serial digital audio data streams clocked into the respective FIFOs 14 may be out of phase to any degree, but the serial digital audio data streams clocked out are synchronous and in phase.

The output serial digital audio data streams from the FIFOs 14 are input in parallel to a switch matrix or router 20, which may be a simple 1 of n digital multiplexer or a more complicated cross point topology. An input select signal is applied to the switch matrix 20 to select the particular one of the serial digital audio data streams at the inputs for transmission. The switching between data streams may occur at any time on serial bit boundaries without corrupting the output data stream The selected serial digital audio data stream is input to an audio transmitter 22 that provides the output serial digital audio signal data stream.

The depth of the FIFOs 14 may be a minimum of 64 bits, but may be larger to allow for greater variations in the asynchronous data stream frequencies before a FIFO overflow or under flow occurs. The AES digital audio is encoded in with a Manchester code called bi-phase mark. The coding removes any D.C. content from the serial data stream. It is possible to switch the undecoded data stream if use of a simpler receiver, i.e., one that doesn't decode, is advantageous, but the FIFOs 14 need to be twice as large and the sync detector circuit 12 needs to be designed to recognize the undecoded sync symbols. Also since the encoded data stream may be either polarity, a circuit to change each data stream's polarity, such as a controllable inverter, is necessary to force all input streams to be of like polarity before they are switched. This architecture also removes jitter which may be present on the input serial digital audio signal data streams.

Thus the present invention provides synchronizing of digital audio signals for switching by inputting each serial digital audio data stream to a FIFO under control of its recovered clock signal and outputting each serial digital audio data stream from the FIFO under control of a common system clock, a sync detect circuit being used to enable the input and output clocking and to reset the FIFO initially in response to a system sync signal.

What is claimed is:

1. An apparatus for synchronizing a plurality of input serial digital audio data streams prior to switching to eliminate corruption of an output serial digital audio data stream after switching comprising:

means for clocking each input serial digital audio data stream into respective buffers under control of a clock recovered from each respective input serial digital audio data stream and for clocking out from the buffers the input serial digital audio data stream under control of a common system clock; and means for detecting from each input serial digital audio data stream a synchronizing symbol in order to inhibit the clocking means from inputting the serial digital audio data stream into the buffer to assure that the data from the serial digital audio data stream first written into the buffer is the synchronizing symbol so that, when the clocking means clocks out the serial digital audio data streams from each of the buffers simultaneously, the serial digital audio data streams are in synchronization.

2. The apparatus as recited in claim 1 wherein the clocking means comprises:

means for extracting the recovered clock from each input serial digital audio data stream, the recovered clock being used to control the clocking of the input serial digital audio data stream into the associated buffer;

an input AND gate associated with each buffer to enable the recovered clock to start clocking the input serial digital audio data stream into the buffer when an input enable signal is received from the detecting means; and an output AND gate associated with each buffer to enable the common system clock to start clocking the input serial digital audio data streams from the buffers simultaneously when an output enable signal is received from the detecting means.

3. The apparatus as recited in claim 2 wherein the detecting means comprises a sync detector associated with each buffer for identifying the synchronizing symbol in the input serial digital audio data stream and generating the input enable signal in response thereto so that the first data stored in the buffers for each input serial digital audio data stream is the synchronizing symbol and for providing the output enable signal in response to a system sync signal when the input serial digital audio data stream is first received.

4. A method of synchronizing a plurality of input serial digital audio data streams prior to switching to eliminate corruption of an output serial digital audio data stream after switching comprising the steps of:

clocking each input serial digital audio data stream into respective buffers under control of a clock recovered from each respective input serial digital audio data stream and for clocking out from the buffers the input serial digital audio data stream under control of a common system clock; and detecting from each input serial digital audio data stream a synchronizing symbol in order to inhibit the clocking step from inputting the serial digital audio data stream into the buffer to assure that the data from the serial digital audio data stream first written into the buffer is the synchronizing symbol so that, when the clocking step clocks out the serial digital audio data streams from each of the buffers simultaneously, the serial digital audio data streams are in synchronization.

* * * * *